US008531444B2

(12) United States Patent
Ito

(10) Patent No.: US 8,531,444 B2
(45) Date of Patent: Sep. 10, 2013

(54) IMAGE DISPLAY APPARATUS, CONTROL METHOD THEREOF, AND COMPUTER-READABLE STORAGE MEDIUM

(75) Inventor: Motohisa Ito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 12/950,126

(22) Filed: Nov. 19, 2010

(65) Prior Publication Data

US 2011/0141079 A1 Jun. 16, 2011

(30) Foreign Application Priority Data

Dec. 11, 2009 (JP) ................................ 2009-282219

(51) Int. Cl.
*G06F 3/038* (2013.01)

(52) U.S. Cl.
USPC .......................................................... 345/207

(58) Field of Classification Search
None
See application file for complete search history.

(56) References Cited

U.S. PATENT DOCUMENTS

| | | | | |
|---|---|---|---|---|
| 5,793,221 | A * | 8/1998 | Aoki | 324/760.01 |
| 5,805,216 | A * | 9/1998 | Tabei et al. | 348/246 |
| 6,002,433 | A * | 12/1999 | Watanabe et al. | 348/246 |
| 6,038,682 | A * | 3/2000 | Norman | 714/10 |
| 6,396,539 | B1 * | 5/2002 | Heller et al. | 348/246 |
| 6,414,661 | B1 * | 7/2002 | Shen et al. | 345/82 |
| 6,683,643 | B1 * | 1/2004 | Takayama et al. | 348/247 |
| 6,947,083 | B2 * | 9/2005 | Nakajima | 348/246 |
| 7,280,090 | B2 * | 10/2007 | Keeney et al. | 345/93 |
| 7,280,142 | B2 * | 10/2007 | Toyoda et al. | 348/246 |
| 7,483,063 | B2 * | 1/2009 | Itakura et al. | 348/246 |
| 7,557,841 | B2 * | 7/2009 | Hashimoto et al. | 348/247 |
| 7,697,053 | B2 * | 4/2010 | Kurtz et al. | 348/333.01 |
| 8,072,513 | B2 * | 12/2011 | Takenaka et al. | 348/246 |
| 8,111,306 | B2 * | 2/2012 | Kuruma et al. | 348/243 |
| 8,130,291 | B2 * | 3/2012 | Kimura | 348/246 |
| 2004/0051798 | A1 * | 3/2004 | Kakarala et al. | 348/246 |

(Continued)

FOREIGN PATENT DOCUMENTS

| | | |
|---|---|---|
| JP | 06-180555 A | 6/1994 |
| JP | 2766942 B | 6/1998 |

(Continued)

*Primary Examiner* — Alexander S Beck
*Assistant Examiner* — Sejoon Ahn
(74) *Attorney, Agent, or Firm* — Fitzpatrick, Cella, Harper & Scinto

(57) ABSTRACT

An image display apparatus having a display screen configured of a plurality of pixels includes a measurement unit adapted to measure a distribution of light amount when the display screen carries out a display, a detection unit adapted to detect a display problem region in the display screen based on an imbalance in the display screen of the distribution of the measured light amount when a uniform image is displayed in the display screen, and a correction unit adapted to perform correction on an image signal that is to be displayed in the display screen so as to suppress the influence of the display problem region on the display. The correction unit includes an expected value calculation unit, a difference value calculation unit adapted to calculate a difference value between an expected value of a distribution of light amount and a measured value of a distribution of light amount when an image based on the image signal corrected by the correction unit is displayed in the display screen, and a correction amount calculation unit adapted to calculate a correction amount for the display problem region detected by the detection unit based on the difference value.

15 Claims, 9 Drawing Sheets

(56) References Cited

U.S. PATENT DOCUMENTS

| | | | | |
|---|---|---|---|---|
| 2004/0174320 | A1* | 9/2004 | Matthijs et al. | 345/30 |
| 2005/0030412 | A1* | 2/2005 | Nakayama | 348/362 |
| 2007/0165119 | A1* | 7/2007 | Ikeda | 348/246 |
| 2008/0012967 | A1* | 1/2008 | Kuwabara | 348/246 |
| 2008/0100728 | A1* | 5/2008 | Nagata | 348/247 |
| 2008/0316336 | A1* | 12/2008 | Oshima | 348/231.99 |
| 2009/0033774 | A1* | 2/2009 | Ohishi et al. | 348/241 |
| 2009/0135452 | A1* | 5/2009 | Matsuura | 358/450 |
| 2009/0180689 | A1* | 7/2009 | Komiya et al. | 382/167 |
| 2010/0066871 | A1* | 3/2010 | Atanassov et al. | 348/246 |
| 2010/0073527 | A1* | 3/2010 | Ichimiya | 348/247 |
| 2010/0141810 | A1* | 6/2010 | Wang et al. | 348/246 |
| 2010/0245632 | A1* | 9/2010 | Suzuki | 348/241 |
| 2010/0253813 | A1* | 10/2010 | Kimura | 348/246 |
| 2010/0277625 | A1* | 11/2010 | Utsugi | 348/246 |
| 2011/0013053 | A1* | 1/2011 | Chen et al. | 348/246 |
| 2011/0050933 | A1* | 3/2011 | Omi | 348/220.1 |

FOREIGN PATENT DOCUMENTS

| | | | |
|---|---|---|---|
| JP | 2001-265312 | A | 9/2001 |
| JP | 2006-067203 | A | 3/2006 |
| JP | 2007-121730 | A | 5/2007 |
| JP | 3962309 | B | 8/2007 |
| JP | 2007-237746 | A | 9/2007 |

* cited by examiner

10/17

IMAGE DISPLAY APPARATUS, CONTROL METHOD THEREOF, AND COMPUTER-READABLE STORAGE MEDIUM

BACKGROUND OF THE INVENTION

1. Field of the Invention

The present invention relates to an image display apparatus that detects display problem areas in a display screen configured of multiple pixels, a control method thereof, and a computer-readable storage medium.

2. Description of the Related Art

Display apparatuses that display images (called simply "displays" hereinafter) generally have a structure in which pixels having light-emitting functionality are disposed in a vertical-horizontal grid form. For example, a full high-definition display is composed of 1,920 horizontal pixels and 1,080 vertical pixels, for a total of 2,073,600 pixels. In such a display apparatus, desired colors are expressed by the colors that are emitted from each of the many pixels mixing together, thus forming a color image.

If in a display apparatus a pixel malfunctions or a problem occurs in the light-emitting functionality thereof, that pixel will of course be unable to emit light and/or color properly. As a result, luminosity unevenness, color unevenness, or the like arises in the display, causing a significant drop in the quality of that display.

Meanwhile, as described earlier, approximately 2,000,000 pixels are present in a full high-definition display. However, it is easy to assume that maintaining uniform functionality in such a high number of pixels over a long period of time will be impossible. Generally speaking, the functionality of a pixel degrades over time. Furthermore, there are often individual differences in the degrees to which such functionality degrades. Accordingly, gaps between the functionalities of pixels become greater the longer the display is used and the higher the pixel count is, leading to an increase in pixels that malfunction or experience light-emitting functionality problems, which in turn leads to more marked luminosity unevenness and color unevenness appearing in the display.

Thus in order to prevent or reduce degradation in the display quality of the display, it is necessary to detect malfunctioning pixels or pixels having light-emission abnormalities, which are causes of display quality degradation, or to detect luminosity unevenness and color unevenness appearing in the display. Various techniques such as those described below have been proposed in order to detect malfunctioning display pixels such as malfunctioning pixels or pixels having light-emission abnormalities, or to detect luminosity unevenness and/or color unevenness.

For example, there is a technique that detects malfunctioning display pixels, luminosity unevenness and/or color unevenness, and so on using an external detection apparatus (see Japanese Patent No. 2766942; called "Patent Document 1" hereinafter). There is also a technique that detects the influence of degradation occurring over time using pixels, separate from pixels used for display, that are provided for detecting degradation occurring over time (for example, see Japanese Publication No. 3962309; called "Patent Document 2" hereinafter). In addition, there is a technique that detects malfunctioning display pixels using variations in the driving voltages and/or driving currents of the various pixels (for example, see Japanese Patent Laid-Open No. 6-180555; called "Patent Document 3" hereinafter). Furthermore, there is a technique that isolates malfunctioning display pixels, luminosity unevenness and/or color unevenness, and so on by a user of the display employing some kind of instructing apparatus (a mouse pointer or the like) on the display while that display is displaying an image used for detection (for example, see Japanese Patent Laid-Open No. 2001-265312 and Japanese Patent Laid-Open No. 2006-67203; called "Patent Document 4" and "Patent Document 5", respectively, hereinafter). Further still, there is a technique that isolates malfunctioning display pixels, luminosity unevenness and/or color unevenness, and so on by a user of the display capturing an image on the display using a consumer digital camera and analyzing that captured image (for example, see Japanese Patent Laid-Open No. 2007-121730; called "Patent Document 6" hereinafter). Finally, there is a technique that isolates malfunctioning display pixels, luminosity unevenness and/or color unevenness, and so on by providing a detector on the rear of the display and using that detector (for example, see Japanese Patent Laid-Open No. 2007-237746; called "Patent Document 7" hereinafter).

However, the above techniques have had the problems described hereinafter.

Patent Document 1 discloses a technique that detects malfunctioning display pixels, luminosity unevenness and/or color unevenness, and so on using an external detection apparatus. With this detection technique, a test image is displayed in the display, and malfunctioning display pixels, luminosity unevenness and/or color unevenness, and so on are detected by obtaining the test image using an external detector and analyzing that image. This detection technique is problematic in that a significant external apparatus is necessary and many operations are required in order to set and adjust the external apparatus. Furthermore, applying such a significant external apparatus to a display that has already been shipped involves difficulties. Accordingly, this detection technique has not been suitable to detect malfunctioning display pixels, luminosity unevenness and/or color unevenness, and so on that increase as the display degrades over time.

Patent Document 2 discloses a technique that detects the influence of degradation occurring over time using pixels, separate from pixels used for display, that are provided for detecting degradation occurring over time. This detection technique is problematic in that a high amount of detection error will occur if the pixels used for display and the pixels that are provided for detecting degradation do not degrade uniformly over time. Furthermore, this detection technique is problematic in that it cannot detect gaps in the degradation over time between individual pixels used for display.

Patent Document 3 discloses a technique that detects malfunctioning display pixels using variations in the driving voltages and/or driving currents of the various pixels. This detection technique is problematic in that because it employs variations in the driving voltages and/or driving currents of the pixels, it is highly susceptible to the influence of electric noise. Furthermore, this detection technique is also problematic in that detection becomes difficult or there is an increase in detection error if the correlation between the driving voltages and/or driving currents and the luminosities of the various pixels breaks down.

Patent Document 4 or Patent Document 5 disclose techniques that isolate malfunctioning display pixels, luminosity unevenness and/or color unevenness, and so on by having a user of the display employ some kind of instructing apparatus on the display while that display is displaying an image that is used for detection. This detection technique is problematic in that it places a heavy burden on the user, and is also problematic in that because there is no guarantee that the user will properly specify the location of the malfunctioning display pixels, luminosity unevenness and/or color unevenness, and so on, the detection accuracy depends on the user.

Patent Document 6 discloses a technique that isolates malfunctioning display pixels, luminosity unevenness and/or color unevenness, and so on by a user of the display capturing an image on the display using a consumer digital camera and analyzing that captured image. As with the detection techniques disclosed in Patent Document 4 or Patent Document 5, this detection technique places a heavy burden on the user, and the detection accuracy thereof also depends on the user.

Patent Document 7 discloses a technique that isolates malfunctioning display pixels, luminosity unevenness and/or color unevenness, and so on by providing a detector on the rear of the display and using that detector. With this detection technique, the detector is provided on the rear of the display, and it is therefore necessary to introduce display light into the detector. There is thus a problem in that this technique cannot be used in a transmissive liquid crystal display. Furthermore, even if the technique is applied in a display aside from a transmissive liquid crystal display, such as a plasma display, the requirement to provide a light introduction path causes a drop in the numerical aperture, which can cause a drop in the display quality.

SUMMARY OF THE INVENTION

The present invention provides an image display apparatus that easily and accurately detects display problem areas in a display screen and a control method for such an image display apparatus.

According to one aspect of the present invention, there is provided an image display apparatus having a display screen configured of a plurality of pixels, the apparatus comprising: a measurement unit adapted to measure a distribution of light amount when the display screen carries out a display; and a detection unit adapted to detect a display problem region in the display screen based on an imbalance in the display screen of the distribution of light amount measured by the measurement unit when a uniform image is displayed in the display screen, wherein the measurement unit is disposed in a boundary area of a front surface panel of the display screen.

Further features of the present invention will be apparent from the following description of exemplary embodiments with reference to the attached drawings.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Apparatus Configuration

Figure 1:
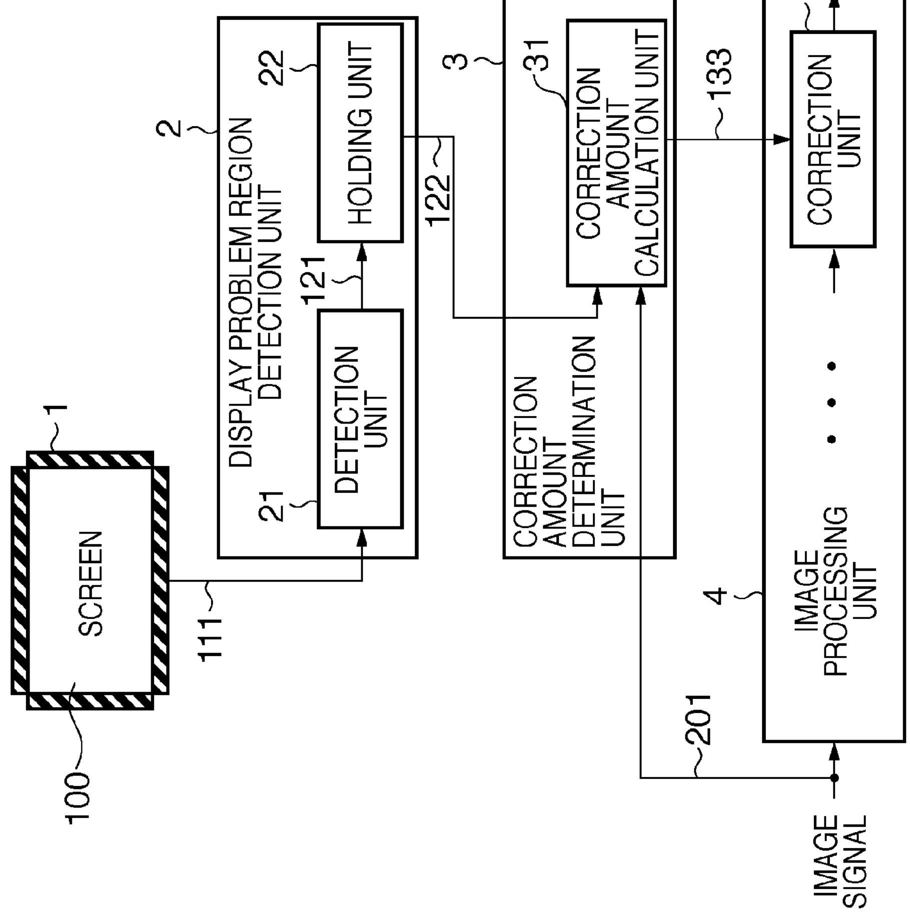
FIG. 1 is a block diagram illustrating the overall configuration of an image display apparatus according to a first embodiment.

FIG. 1 is a block diagram illustrating the configuration of an image display apparatus according to the present embodiment. In FIG. 1, 100 indicates a display screen on which detection of display problems is to be performed in the present embodiment; the display screen 100 is configured of multiple pixels. 1 indicates a light power density distribution measurement unit, which is disposed so as to surround the surface of the display screen 100 and to measure the distribution of light amount in the display light thereof.

2 indicates a display problem region detection unit, which detects a region in which luminosity unevenness and/or color unevenness occurs due to a malfunction in light emission and/or color emission, or in other words, a display problem region, based on an output 111 from the light power density distribution measurement unit 1. The display problem region detection unit 2 includes at least a detection unit 21 and a holding unit 22; the detection unit 21 detects information 121 of a display problem region based on the output 111 of the light power density distribution measurement unit 1. The information 121 of the display problem region includes coordinate information of the display problem region, but the information 121 may include other information as well. The holding unit 22 is a unit that holds the information 121 of the display problem region, and any configuration may be employed for the holding unit 22 as long as the held information 121 can be referred to by a correction amount calculation unit 31 as information 122 of a display problem region. For example, the holding unit 22 may be configured of a memory device, such as a DRAM, or may be configured of a hard disk (HDD).

3 indicates a correction amount determination unit, and a correction amount 133 used by a correction unit 41 is calculated by the correction amount calculation unit 31. Of course, the correction amount determination unit 3 can also include other elements aside from the correction amount calculation unit 31. 4 indicates an image processing unit, which includes the correction unit 41. The correction unit 41 executes a correction process using the correction amount 133, thereby avoiding the effects of the display problem region in the display screen 100 and preventing or reducing degradation in the display quality. Although FIG. 1 illustrates an example in which the correction unit 41 is provided as an independent unit within the image processing unit 4, it should be noted that the correction unit 41 may of course be provided in another location instead.

Figure 2:
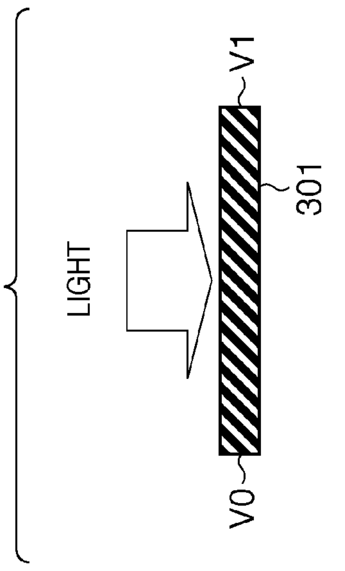
FIG. 2 is a diagram illustrating the principle of operations of a PSD.

Here, the light power density distribution measurement unit 1 will be described in detail. First, a light power density distribution sensor 11 may have any function as long as it is capable of measuring the center location of a distribution of light amount. Accordingly, the present embodiment illustrates an example in which a position sensitive detector (PSD) is employed as the sensor element of the light power density distribution sensor 11. Operations of the PSD will be described briefly using FIG. 2. In FIG. 2, 301 indicates the PSD, and light is incident on the PSD 301 from the vertical direction thereabove. Voltages V0 and V1 are generated at the ends of the PSD in accordance with the power of the incident light. It is possible to estimate the center location of the incident light power based on the ratio between the voltages that are generated at the ends of the PSD. For example, if the voltages at both ends are equal, or in other words, V0/V1=1, it is assumed that the center of the light power corresponds with the center of the PSD. However, in the case where there is a difference between the voltages at both ends, it is assumed that the center of the light power is located toward the side with a higher voltage, and it is possible to estimate the center location with high accuracy based on the ratio between those voltages. For example, if V0/V1>1, the center of the light power is located toward V0, or to rephrase, the left side in FIG. 2 is brighter than the right side in FIG. 2. Conversely, if V0/V1<1, the center of the light power is located toward V1, and the right side in FIG. 2 is brighter than the left side in FIG. 2.

Note that the light power density distribution sensor 11 according to the present embodiment may be capable of measuring other physical amounts aside from just the center location of the incident light power. Therefore, the light power density distribution sensor 11 is not limited to a PSD.

Figure 3A:
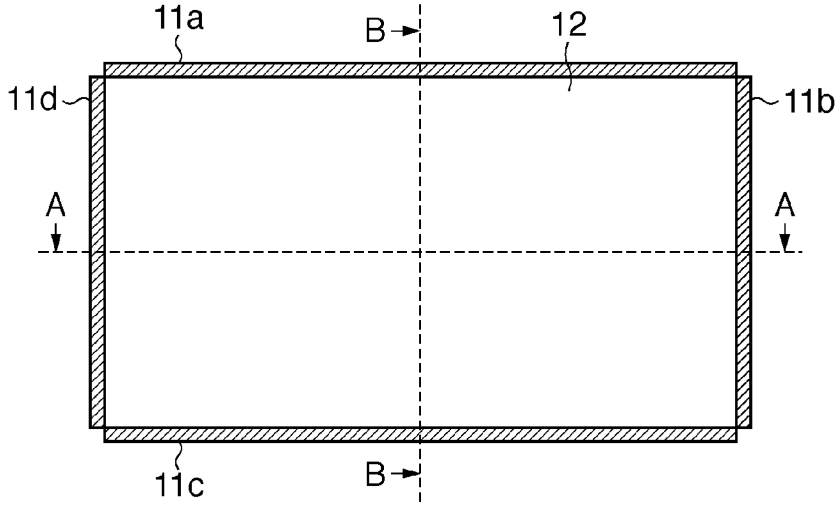
FIGS. 3A, 3B, and 3C are diagrams illustrating examples of the installation state of a PSD.
Figure 3B:
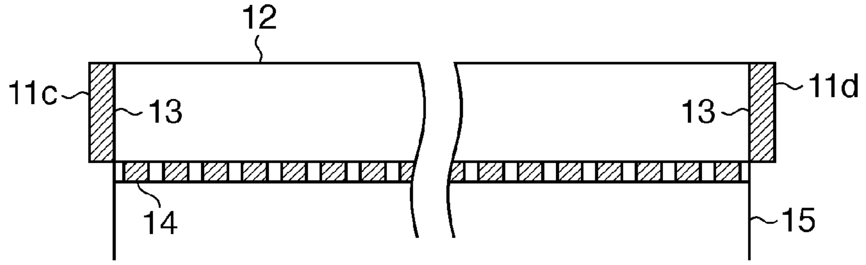
Figure 3C:
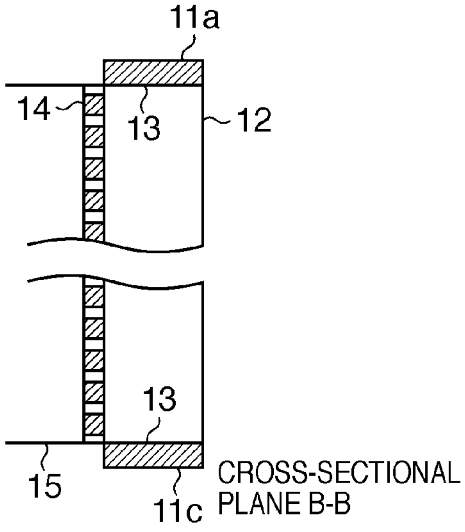

Hereinafter, the light power density distribution sensor 11 shall be denoted simply as a PSD 11. The installation state of the PSD 11 will be described in detail using FIGS. 3A through 3C. As shown in FIG. 3A, the PSD 11 (PSDs 11*a* to 11*d*) according to the present embodiment is installed in the boundary areas of a front surface panel 12, which is configured of a colorless transparent member (for example, glass) located on the surface of the display screen 100. Here, the front surface panel 12 has a rectangular shape, and thus the PSD 11 is installed on the four sides thereof. 11*a* indicates the PSD that is installed on the upper side of the front surface panel 12, and likewise, 11*b*, 11*c*, and 11*d* indicate the PSDs that are installed on the right side, the lower side, and the left side, respectively, of the front surface panel 12. FIGS. 3B and 3C are each cross-sectional views taken along the cross-sectional planes A-A and B-B indicated in FIG. 3A; 14 indicates pixels, whereas 15 indicates a holding board for the display screen 100. As shown in FIGS. 3A to 3C, the PSDs 11*a* to 11*d* are tightly affixed to the front surface panel 12 with the light-receiving surfaces 13 thereof facing toward the front surface panel 12.

By installing the PSDs 11*a* to 11*d* in this manner, the light emitted from the pixels 14 is received through the front surface panel 12, thus making it possible to estimate the center location of the distribution of light amount in the front surface panel 12. In other words, the pair of PSDs 11*a* and 11*c* detects the center location in a first direction by measuring the distribution of light amount (a first distribution of light amount) in the lengthwise direction (the first direction) of the front surface panel 12. Meanwhile, the pair of PSDs 11*b* and 11*d* detects the center location in a second direction by measuring the distribution of light amount (a second distribution of light amount) in the widthwise direction (the second direction) of the front surface panel 12. Of course, the first direction and the second direction, or in other words, the lengthwise direction and the widthwise direction of the front surface panel 12, are orthogonal to each other.

Display Problem Region Detection Process

Hereinafter, a display problem region detection process performed by the display problem region detection unit 2 will be described. First, the principles of display problem region detection according to the present embodiment will be described using FIGS. 4A through 4C.

Figure 4A:
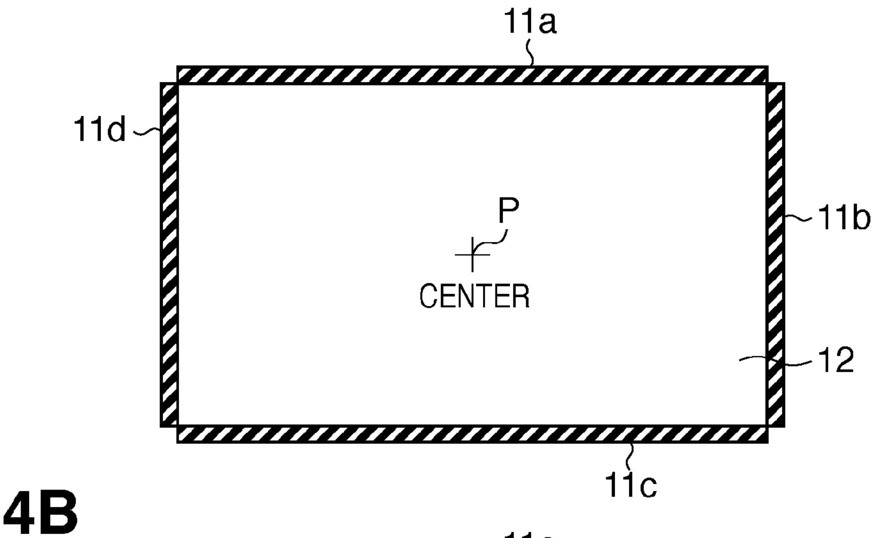
FIGS. 4A, 4B, and 4C are diagrams illustrating principles of the detection of a display problem region.
Figure 4B:
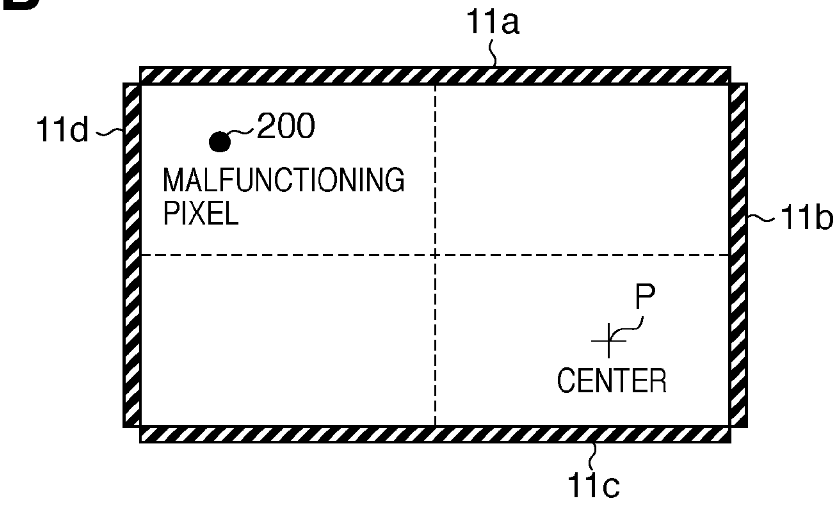
Figure 4C:
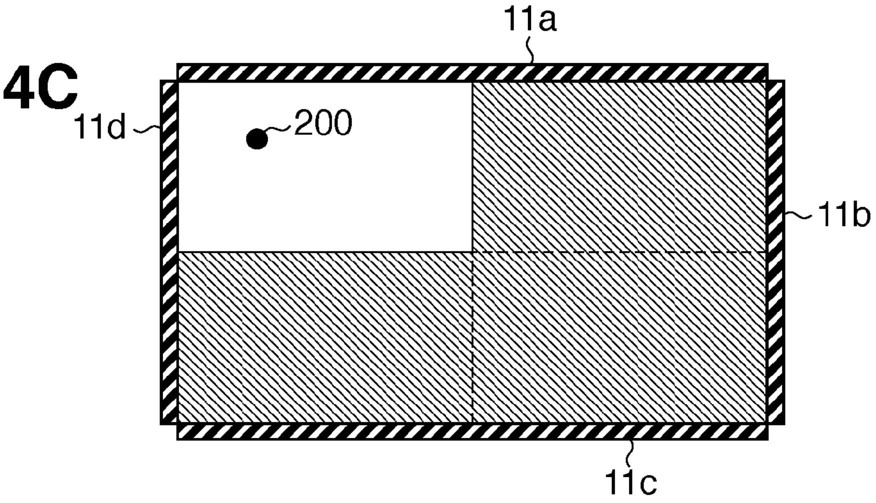

FIGS. 4A through 4C illustrate a state in which the PSDs 11*a* to 11*d* are installed on the four boundaries of the front surface panel 12, as is illustrated in the aforementioned FIG. 3A. Here, a situation will be considered in which, for example, all of the pixels in the display screen 100 are displaying a uniform image, such as a solid white image, and thus are lit at a uniform luminosity. If all of the pixels are functioning properly at this time, there are no imbalances in the distribution of light amount in the display screen, and thus the output values of the PSDs 11*a* to 11*d* are uniform as well; accordingly, the center P of the distribution of light amount is in the center of the front surface panel 12, as indicated in FIG. 4A. However, in the case where a malfunctioning display pixel 200 is present in the display screen 100, as shown in FIG. 4B, an imbalance occurs in the distribution of light amount and the output values of the PSDs 11*a* to 11*d* differ from each other; accordingly, the center P of the distribution of light amount is shifted from the center of the front surface panel 12. In this case, assuming that the center of the front surface panel 12 is the origin, it can be seen that the malfunctioning display pixel 200 is present in the quadrant that is opposite diagonally in a symmetrical manner from the quadrant in which the center P is present.

In the example shown in FIG. 4B, the region in which the malfunctioning display pixel 200 is present is isolated to a region that is ¼ of the front surface panel 12, and this is of course still too large to isolate the display problem region. Accordingly, next, only the quadrant of the display screen 100 in which the malfunctioning display pixel 200 is present is illuminated as a target region, and the other quadrants are extinguished, as shown in FIG. 4C. In such a state in which only the target region is illuminated, the center of the distribution of light amount in the target region is detected based on the output values of the PSDs 11*a* to 11*d*, as was carried out earlier, and if the center of the target region differs from the center of the distribution of light amount therein, the region (quadrant) in which the malfunctioning display pixel is present is further isolated to a region that is ¼ of the target region.

In this manner, the display problem region in which the malfunctioning display pixel 200 is present can be specified at a desired size by repeating the process that reduces the target region to ¼ the size in a single detection.

Figure 5:
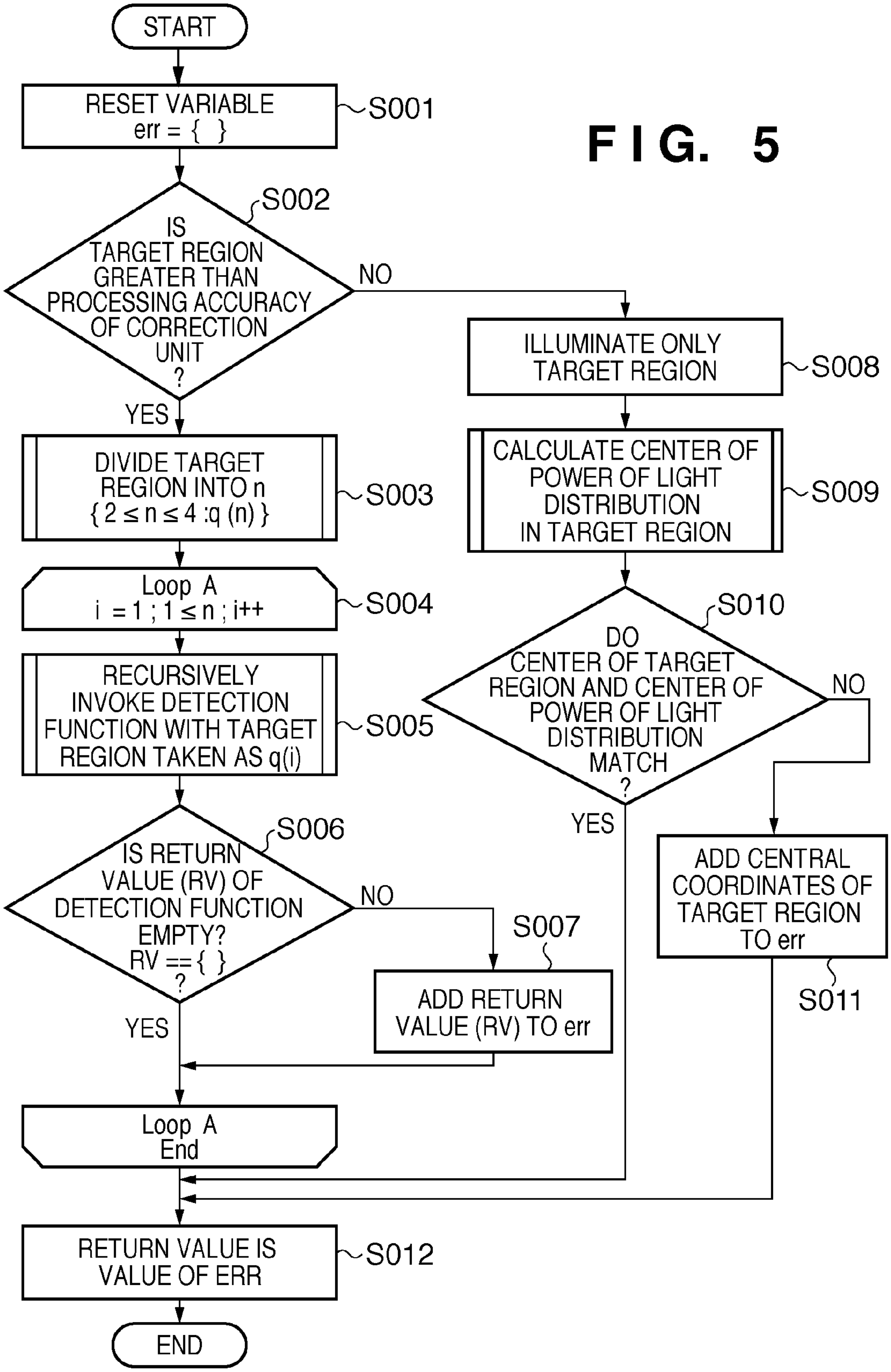
FIG. 5 is a flowchart illustrating a display problem region detection process.

Hereinafter, the display problem region detection process performed by the display problem region detection unit 2 will be described using the flowchart in FIG. 5. The detection unit 21, which detects the display problem region, executes a detection function using the coordinates and size of the region on which the detection process is to be carried out ("target region" hereinafter) as the arguments, and takes the return value of the function as RV. Note that the return value RV is assumed to be a list type. Therefore, in other words, the flowchart illustrated in FIG. 5 shows a process of a display problem region detection function.

First, in S001, a list type variable err that holds the central coordinates of the display problem region is reset. Then, in S002, the size of the target region for processing is compared with the degree of processing accuracy of the correction unit 41. Because the size of the target region is stored as an argument, that argument may simply be referred to. If the size of the target region is greater than the processing accuracy of the correction unit 41, the target region is divided in S003, whereas if the size of the target region is not greater than the processing accuracy of the correction unit 41, it is determined, in the processes of S008 and on, whether or not a display problem is present in the target region.

In S003, the target region that is greater than the processing accuracy of the correction unit 41 is divided equally based on the coordinates and size of the target region held in the argument. Here, the number of divisions is determined as follows based on the size of the target region. Assuming that the number of divisions is n and the regions obtained through the division are q(1) to q(n), first, in the case where the size of the target region is greater than 1× and less than or equal to 2× the processing accuracy of the correction unit 41, the number of divisions n=2. Likewise, in the case where the size of the target region is greater than 2× and less than or equal to 3× the processing accuracy of the correction unit 41, the number of divisions n=3, and in the case where the size of the target region is greater than 3× the processing accuracy of the correction unit 41, the number of divisions n=4.

Next, in step S004, the processes from S005 to S007 are repeated. The number of repetitions is equivalent to the number of divisions n obtained in S003. In other words, assuming that a repetition variable is taken as i, the processing is repeated from i=1 to n while incrementing i. When n number of repetitions has been completed in S004, the process advances to S012.

In S005, the display problem region detection function is recursively invoked using the coordinates and size of the target region q(i) obtained through the division as arguments. By recursively invoking this function in this manner, the display problem region is searched for until the target region in the aforementioned S002 becomes a size that cannot be processed by the correction unit 41, and this is repeatedly carried out for all regions in the display screen 100. Accordingly, all display problem regions are detected throughout all of the regions in the display screen 100.

Next, in S006, it is determined whether or not the return value RV of the detection function executed in S005 is empty, or in other words, whether or not a display problem region has been detected. If the return value RV is not empty, the process branches to S007 under the assumption that a display problem has been detected in the target region, whereas if the return value RV is empty, the process returns to S004 under the assumption that a display problem has not been detected in the target region.

In S007, the return value RV of the detection function is added to the variable err for holding the central coordinates of the display problem region. Here, because both the return value RV and the variable err are of the list type, the addition process in S007 can be executed as a normal list process. The process returns to S004 after S007.

Next, the processing performed in the case where the process has branched from S002 to S008, or in other words, in the case where the size of the target region does not exceed the processing accuracy of the correction unit 41, will be described. In S008, only the target region in the display screen 100 is illuminated. In other words, white is displayed in the target region, whereas black is displayed in the regions aside from the target region. However, the color of the display is not limited to white, and in, for example, the case where red color unevenness is to be detected, the display color may be set to red by causing only the red subpixels to emit light.

Figure 6A:
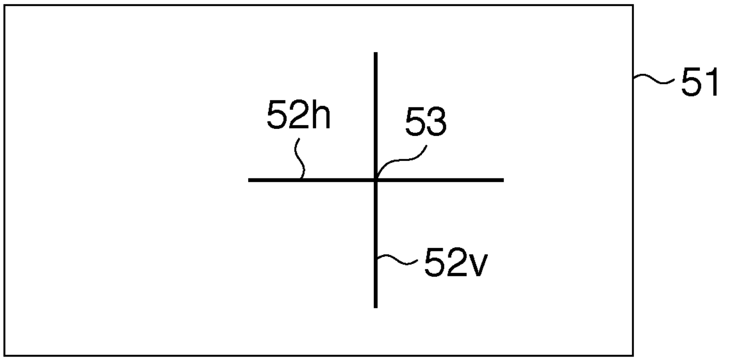
FIGS. 6A and 6B are diagrams illustrating a method for calculating the center of a distribution of light amount in a target region.
Figure 6B:
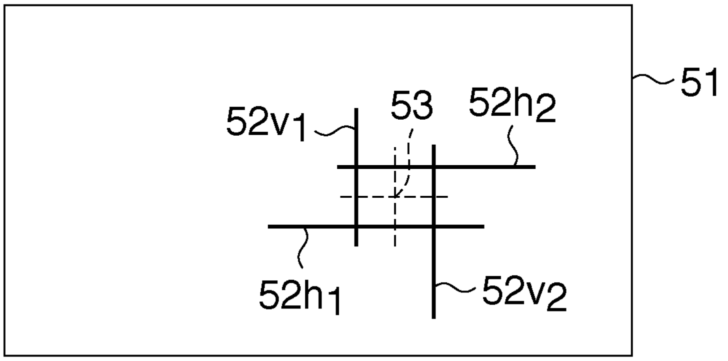

Next, in S009, the center of the distribution of light amount in the target region is calculated based on the detection value of the PSD 11. Here, the method for calculating the center of a distribution of light amount in the target region will be described using FIGS. 6A and 6B. First, in FIG. 6A, 52*v* is a vertical axis indicating the center location of the distribution of light amount as detected by the PSDs 11*a* and 11*c*, whereas 52*h* is a horizontal axis indicating the center location of the distribution of light amount as detected by the PSDs 11*b* and 11*d*. In FIG. 6A, the vertical axis 52*v* and the horizontal axis 52*h* intersect at a single point, and thus that intersection point is detected as a light power distribution center 53. Meanwhile, FIG. 6B illustrates an example in which the vertical and horizontal axes do not intersect at a single point. In FIG. 6B, 52*v*1 and 52*v*2 are vertical axes indicating the center location of the distribution of light amount as detected by the PSDs 11*a* and 11*c*, respectively, whereas 52*h*1 and 52*h*2 are horizontal axes indicating the center location of the distribution of light amount as detected by the PSDs 11*b* and 11*d*, respectively. In FIG. 6B, there are more than one of each of the vertical and horizontal axes, and thus those axes do not intersect at a single point; accordingly, in this case, the center of the quadrangle formed by the axes 52*h*1, 52*h*2, 52*v*1, and 52*v*2 is detected as the light power distribution center 53.

Next, in S010, it is determined whether or not the coordinates of the center of the distribution of light amount as detected in S009 match the central coordinates of the target region. If the sets of coordinates match, it is determined that the display problem region is not present in the target region, and the process branches to S012. However, if the sets of coordinates do not match, the distribution of light amount is not uniform in the target region; it is thus determined that a display problem is present, or in other words, that the target region is the display problem region, and the process branches to S011.

In S011, the central coordinates of the target region are added to the variable err for holding the central coordinates of the display problem region. This addition process can be executed using a normal list process. The process advances to S012 after S011.

As a final process, the detection function of the display problem region sets the return value to the value of the variable err in S012, and returns to invoking.

Thus, as described thus far, with the detection function, the target region is divided until it is smaller than the processing accuracy of the correction unit 41, and display problems can be detected in units of those regions obtained through the division; the central coordinates of all regions in which display problems were detected are held in the return value RV of the detection function. The value of the return value RV is held in the holding unit 22 as the information 121 of the display problem region, and is referred to by the correction amount calculation unit 31 as the information 122 of the display problem region.

Correction Process

Hereinafter, a correction process carried out in accordance with the display problem region detected as described above will be described.

The correction unit 41 is a unit that carries out a correction process to avoid or reduce the influence of display problem regions in the display screen 100, and carries out correction based on the correction amount calculated by the correction amount calculation unit 31 for each display problem region detected by the display problem region detection unit 2. The correction amount 133 generated by the correction amount calculation unit 31 depends on the specifications of the correction unit 41, or in other words, on the content of the correction process. For example, if the correction unit 41 has a function for reducing the appearance of display problems by performing smoothing using a filter process, it is necessary for the format of the correction amount 133 to be a filter coefficient used in that filter process. However, the specifications of the correction unit 41 are of course not limited to a smoothing filter process, and thus the process performed by the correction amount calculation unit 31 is also not limited to the generation of a filter coefficient; any format may be employed as long as the correction amount 133 is generated in accordance with the specifications of the correction unit 41.

In the present embodiment, it is assumed that the correction unit 41 carries out a smoothing filter process. Although many methods such as simple averaging, median filtering, and so on are known as typical smoothing filter processes, the present embodiment makes no particular limitation on the method employed. Furthermore, a single type of smoothing filter may be used for the correction process in the present embodiment, or multiple smoothing filter types may be switched as appropriate and used. For example, the optimal smoothing filter type may be selected in accordance with an image signal 201, the information 122 of the display problem region, and so on. To be more specific, one method that can be considered would be to apply simple averaging, median filtering, or the like for luminosity unevenness arising due to a drop in the light-emitting functionality of pixels, and apply countergradient weighting for black dots caused by malfunctioning pixels.

As described thus far, according to the present embodiment, display problem regions in the display screen 100 can be automatically detected with ease, and control can be carried out so as to correct those display problem regions. Accordingly, it is possible to detect malfunctioning display pixels, luminosity unevenness and/or color unevenness, and so on in the display screen, which become more marked, for example, with the passage of time following the delivery of the image display apparatus, with ease, without requiring a significant detection apparatus and without succumbing to external influences. Furthermore, it is possible to maintain a consistently high display quality in the image display apparatus over a long period of time following the delivery of the apparatus by performing correction on image signals that are to be displayed so as to suppress the influence of the detected display problem regions.

The present embodiment describes an example in which the PSD 11 is installed at the four side boundaries of the front surface panel 12. However, any such format may be used in the present embodiment as long as the distribution of light amount in the horizontal direction and the vertical direction of the display screen 100 can be detected. Accordingly, the PSD 11 may be installed only on two sides of the front surface panel 12 that are not opposite to each other, or in other words, on a first side of the front surface panel 12 and a second side that is orthogonal to the first side (for example, the PSDs 11*a* and 11*b*). However, installing the PSD 11 on all sides of the front surface panel 12 will of course improve the detection accuracy.

(Second Embodiment)

Hereinafter, a second embodiment of the present invention will be described. The aforementioned first embodiment described an example in which a display problem region is detected by first displaying, for example, a uniform image in the display screen 100, and then calculating a correction amount based on the results of that detection. In the second embodiment, the corrected image is furthermore displayed in the display screen 100, and by comparing the center location measured at that time with a center location calculated theoretically from the uncorrected image data, the correction results are verified in a dynamic manner.

Apparatus Configuration

Figure 7:
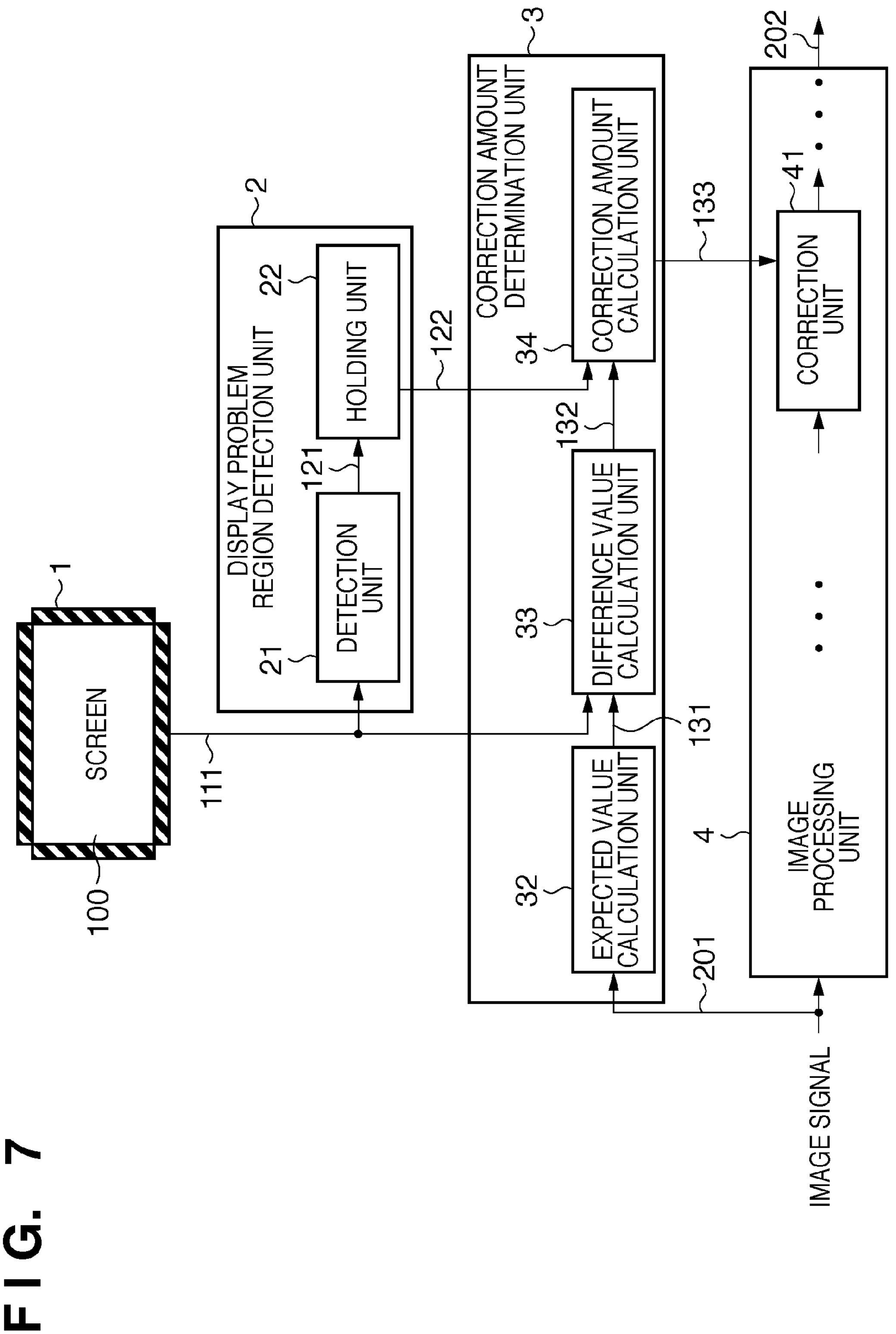
FIG. 7 is a block diagram illustrating the overall configuration of an image display apparatus according to a second embodiment.

FIG. 7 is a block diagram illustrating the overall configuration of an image display apparatus according to the second embodiment. In FIG. 7, constituent elements that are the same as those illustrated in FIG. 1 and described in the aforementioned first embodiment are given the same reference numerals, and descriptions thereof will be omitted. In other words, in the second embodiment, the correction amount determination unit 3 includes an expected value calculation unit 32, a difference value calculation unit 33, and a correction amount calculation unit 34.

The expected value calculation unit 32 calculates an expected center location 131 as the expected output of the light power density distribution measurement unit 1 in the case where it is assumed, based on the uncorrected image signal 201, that a display problem region is not present in the display screen 100. The difference value calculation unit 33 calculates a difference 132 between the expected center location 131 and a center location based on a measurement value 111 of the light power density distribution measurement unit 1 obtained when a corrected image signal 202 is displayed in the display screen 100 (that is, a measured center location). The correction amount calculation unit 34 updates the correction amount 133, calculated in the same manner as described in the first embodiment, based on the difference 132 and the information 122 of the display problem region.

In the second embodiment configured as described above, first, the correction amount 133 is calculated in the same manner as described in the aforementioned first embodiment. Then, the correction amount 133 is applied to the image signal 201 by the correction unit 41 and the corrected image signal 202 is displayed in the display screen 100; as a result, it is verified whether or not the correction amount 133 is appropriate, and if the correction amount 133 is not appropriate, the correction amount 133 is updated. Details of this correction will be described later.

Expected Value Calculation Process

Hereinafter, a process by which the expected value calculation unit 32 calculates the expected center location of the distribution of light amount will be described in detail. Note that the configuration of the light power density distribution measurement unit 1 is the same as that described in the aforementioned first embodiment, a PSD is employed as the light power density distribution sensor 11, and the PSD 11 is installed on the four sides of the front surface panel 12.

Figure 8:
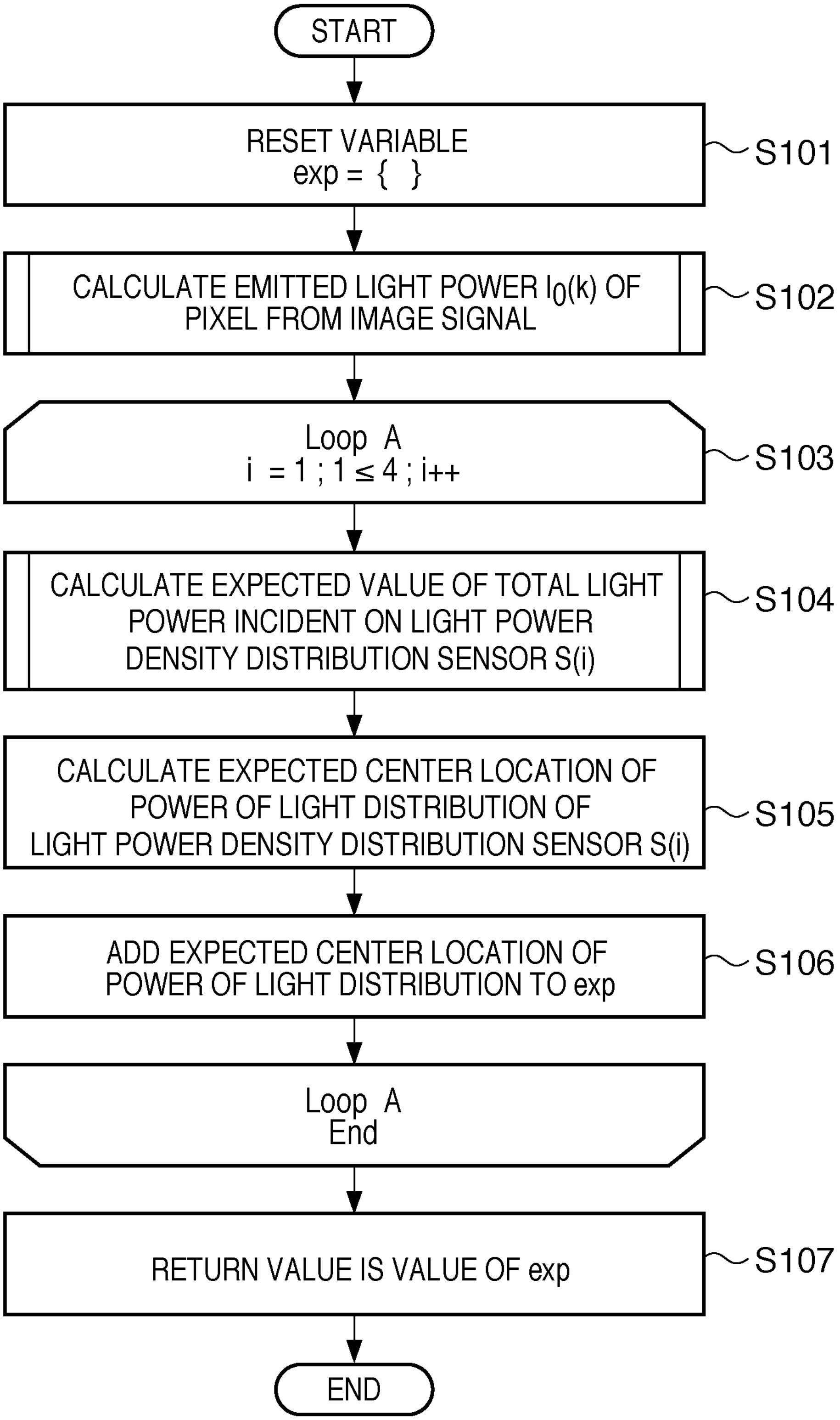
FIG. 8 is a flowchart illustrating a process for calculating an expected center location.

FIG. 8 is a flowchart illustrating a process of a function, executed by the expected value calculation unit 32, that calculates the expected center location 131, but before explaining this flowchart, variables and symbols used in the calculation process will be defined hereinafter.

exp: a list-type variable that holds an expected value n: the total pixel count of the display screen k: a pixel number assigned uniquely to each pixel ($1 \leqq k \leqq n$)

Io(k): the light power of the light emitted by the pixel with a pixel number k

X(k), Y(k): the x, y coordinates of the pixel with a pixel number k

S(i): PSD 11 (i is a number for identifying the PSDs 11 as follows

S(1): PSD 11*a*

S(2): PSD 11*b*

S(3): PSD 11*c*

S(4): PSD 11*d* l: the length of the upper and lower sides of the front surface panel 12 m: the length of the right and left sides of the front surface panel 12 t: a location relative to the PSD 11

L(t,k): the distance to t from the pixel with the pixel number k

Ip(t,k): the light power of the pixel with the pixel number k that is incident on t I(t): the total light power that is incident on t α: the absorption coefficient of the front surface panel 12 ge(i): the expected value of the center location of the distribution of light amount in the PSD 11 g(i): the measured value of the center location of the distribution of light amount in the PSD 11

Next, the coordinate system in the front surface panel 12 is set as follows. First, the upper left corner of the front surface panel 12 is set as the origin (0,0). The axis extending to the right therefrom is taken as the x axis, whereas the access extending downward therefrom is taken as the y axis.

In FIG. 8, first, in S101, the variable exp is reset, and then, in S102, the light emission power of each of the pixels {Io(k): 1≦k≦n} is calculated from the image signal 201 corresponding to the entirety of the display screen 100.

Next, in step S103, the processes from S104 to S106 are repeated for each of the PSDs 11 (S(1) to S(4)). First, in S104, an expected value of the total light power that is incident on the PSD 11 is calculated. In other words, the total light power incident upon the point t in the PSD 11 is found by finding the sum of the light powers that are incident upon the point t from all of the pixels. The expected value of the total light power incident upon the PSD 11 is calculated by executing this process from one end of the PSD 11 to the opposite end of the PSD 11.

Here, the process for calculating the expected value of the light power as performed in the aforementioned S104 will be described using the PSD 11*a* on the upper side of the front surface panel 12, or in other words, S(1), as an example.

S(1) is installed on the upper side of the front surface panel 12, and thus the coordinates of the point upon S(1) are expressed as (t, 0). Because the lengths of the upper side and lower side of the front surface panel 12 are l, the range of the variable t is 0≦t≦l. Here, the distance L(t,k) from the pixel with the pixel number k to the point t upon S(1) is indicated by the following Formula (1), using the x, y coordinate values X(k),Y(k) of that pixel.

$$L(t,k)=\sqrt{(X(k)-t)^2+Y(k)^2} \quad (1)$$

The light power Ip(t,k) of the light emitted by the pixel with the pixel number k that has reached the point t is expressed through the following Formula (2) in accordance with the Beer-Lambert law. In this formula, the coefficient α represents the absorption coefficient of the front surface panel 12, a coefficient that differs depending on the front surface panel 12.

$$Ip(t,k)=I(k)e^{-\alpha L(t,k)}=I(k)e^{-\alpha\sqrt{(X(k)-t)^2+Y(k)^2}} \quad (2)$$

Meanwhile, the total light power I(t) incident on the location t of the PSD 11 is the sum of the light powers Ip(t,k) of all the pixels, and is thus expressed through the following Formula (3); this is output as the expected value.

$$I(t)=\sum_{k=1}^{n} Ip(t,k)=\sum_{k=1}^{n} I(k)e^{-\alpha\sqrt{(X(k)-t)^2+Y(k)^2}} \quad (3)$$

Next, in S105, the expected value ge(i) of the center location of the distribution of light amount in the PSD 11 is calculated. Generally, the center location of a matter is found by dividing the sum of the mass moment by the sum of the mass. Likewise, the center location of the distribution of light amount can be calculated by dividing the sum of the light power moment by the sum of the light power. In the second embodiment, the light power density distribution sensor 11 is configured of a PSD, and because the resolution of the PSD is theoretically infinitely small, integrals are used to find the sum of the light power. Accordingly, ge(1) for the upper side of the front surface panel 12 is expressed through the following Formula (4) using the position t on the PSD 11, the total light power I(t) incident on t, and the length 1 of the PSD 11. In Formula (4), the denominator expresses the sum of the light power incident on S(1), whereas the numerator expresses the light power moment at the point t upon the PSD 11.

$$g_e(1)=\frac{\int_0^l tI(t)\,dt}{\int_0^l I(t)\,dt}=\frac{\int_0^l t\sum_{k=1}^{n} I(k)e^{-\alpha\sqrt{(X(k)-t)^2+Y(k)^2}}\,dt}{\int_0^l \sum_{k=1}^{n} I(k)e^{-\alpha\sqrt{(X(k)-t)^2+Y(k)^2}}\,dt} \quad (4)$$

The expected values ge(2), ge(3, and ge(4) for the center locations of the distributions of light power in the other PSDs 11 are found in the same manner. Because the coordinates of the point t upon S(2) are (l,t), the coordinates of the point t upon S(3) are (t,m), and the coordinates of the point t upon S(4) are (0,t), ge(2), ge(3), and ge(4) are found through the following Formulas (5) through (7), respectively.

$$g_e(2)=\frac{\int_0^m t\sum_{k=1}^{n} I(k)e^{-\alpha\sqrt{(X(k)-l)^2+(Y(k)-t)^2}}\,dt}{\int_0^m \sum_{k=1}^{n} I(k)e^{-\alpha\sqrt{(X(k)-l)^2+(Y(k)-t)^2}}\,dt} \quad (5)$$

$$g_e(3)=\frac{\int_0^l t\sum_{k=1}^{n} I(k)e^{-\alpha\sqrt{(X(k)-t)^2+(Y(k)-m)^2}}\,dt}{\int_0^l \sum_{k=1}^{n} I(k)e^{-\alpha\sqrt{(X(k)-t)^2+(Y(k)-m)^2}}\,dt} \quad (6)$$

$$g_e(4)=\frac{\int_0^m t\sum_{k=1}^{n} I(k)e^{-\alpha\sqrt{X(k)^2+(Y(k)-t)^2}}\,dt}{\int_0^m \sum_{k=1}^{n} I(k)e^{-\alpha\sqrt{X(k)^2+(Y(k)-t)^2}}\,dt} \quad (7)$$

Next, in S106, ge(i) is added to the variable exp. Because the variable exp is a list type variable, the addition process of S106 can be executed using a normal list process. Finally, in S107, the value of the variable exp is set for the return value, and the process returns to invoking.

As described above, with the expected value calculation unit 32, the center location of the distribution of light amount that is expected to be detected in the image signal 201 by the PSD 11 is stored as the return value of an expected value calculation function for the distribution of light amount, and is output as the expected center location 131.

Difference Value Calculation Process

Hereinafter, a process performed by the difference value calculation unit 33 for calculating the difference between the measured center location of the distribution of light amount and the expected center location will be described.

First, the difference value calculation unit 33 obtains the center location of the display screen 100 that has been displayed based on the corrected image signal 202. In other words, the difference value calculation unit 33 calculates the center location of the distribution of light amount for the entirety of the display screen 100 based on the output 111 of the light power density distribution measurement unit 1, and takes that calculated center location as the measured center location. Because the process for obtaining the center location based on the output 111 is the same as the process indicated in S009 of FIG. 5 and described in the aforementioned first embodiment, descriptions thereof will be omitted here.

Next, the difference 132 between the measured center location based on the measurement value 111 and the expected center location 131 calculated by the expected value calculation unit 32 is calculated. In other words, a difference Δg between the measured center location {g(1),g(2),g(3),g(4)} based on the distribution of light amount measured by the PSD 11 and the expected center location {ge(1),ge(2),ge(3),ge(4)} calculated by the expected value calculation unit 32 is computed through the following formulas. It should be noted that the measured center location based on the measurement value 111 of the light power density distribution measurement unit 1 and the expected center location 131 calculated by the expected value calculation unit 32 are both four-element vectors corresponding to the respective four sides of the display screen 100. Accordingly, the operation performed by the difference value calculation unit 33 indicated in the following Formula (8) is vector subtraction.

$$\Delta g = g - g_e = \begin{pmatrix} g(1) \\ g(2) \\ g(3) \\ g(4) \end{pmatrix} - \begin{pmatrix} g_e(1) \\ g_e(2) \\ g_e(3) \\ g_e(4) \end{pmatrix} \tag{8}$$

In this manner, the difference value calculation unit 33 obtains the center location for the corrected image displayed in the display screen 100, and calculates the difference Δg between that center location and the expected center location 131 theoretically calculated from the uncorrected data.

Correction Process

Hereinafter, a display problem region correction process according to the second embodiment will be described. In the second embodiment, the correction of the image signal 201 that is to be displayed is carried out dynamically based on the result of displaying the corrected image signal 202 in the display screen 100.

Like the correction amount calculation unit 31 of the aforementioned first embodiment, the correction amount calculation unit 34 according to the second embodiment calculates the correction amount 133 for the display problem region detected by the display problem region detection unit 2. Accordingly, the correction amount 133 that serves as an update result for the correction amount calculation unit 34 depends on the specifications of the correction unit 41, or in other words, on the content of the correction process. In other words, the correction process performed by the correction unit 41 is not particularly limited in the second embodiment as well; thus, for example, smoothing using a filter process may be carried out, in which case the format of the correction amount 133 is a filter coefficient used in the filter process.

As in the first embodiment, the correction unit 41 according to the second embodiment carries out correction on the entire image displayed in the display screen 100 based on the correction amount 133 calculated and updated by the correction amount calculation unit 34 for each display problem region.

Hereinafter, a process by which the correction amount calculation unit 34 dynamically updates the correction amount 133 will be described. Because the image signal 201 that is to be displayed is a single frame in a moving picture in the second embodiment, the correction amount 133 output from the correction amount calculation unit 34 is a value that is updated based on the result of correcting that single frame. The correction amount 133 according to the present embodiment is employed so as to suppress the influence of display problem areas in the display screen 100, and thus even if the value thereof applies to a specific frame, that value is similarly useful for other frames, or in other words, for other scenes. Accordingly, by verifying the result of applying the correction amount 133 to a certain frame in the image signal 201, the correction amount calculation unit 34 repeatedly calculates, or in other words, updates the correction amount 133 until the measured center location in following frames approaches the expected center location to a sufficient degree. In other words, the result of verifying a first frame is applied to the following second frame.

Figure 9:
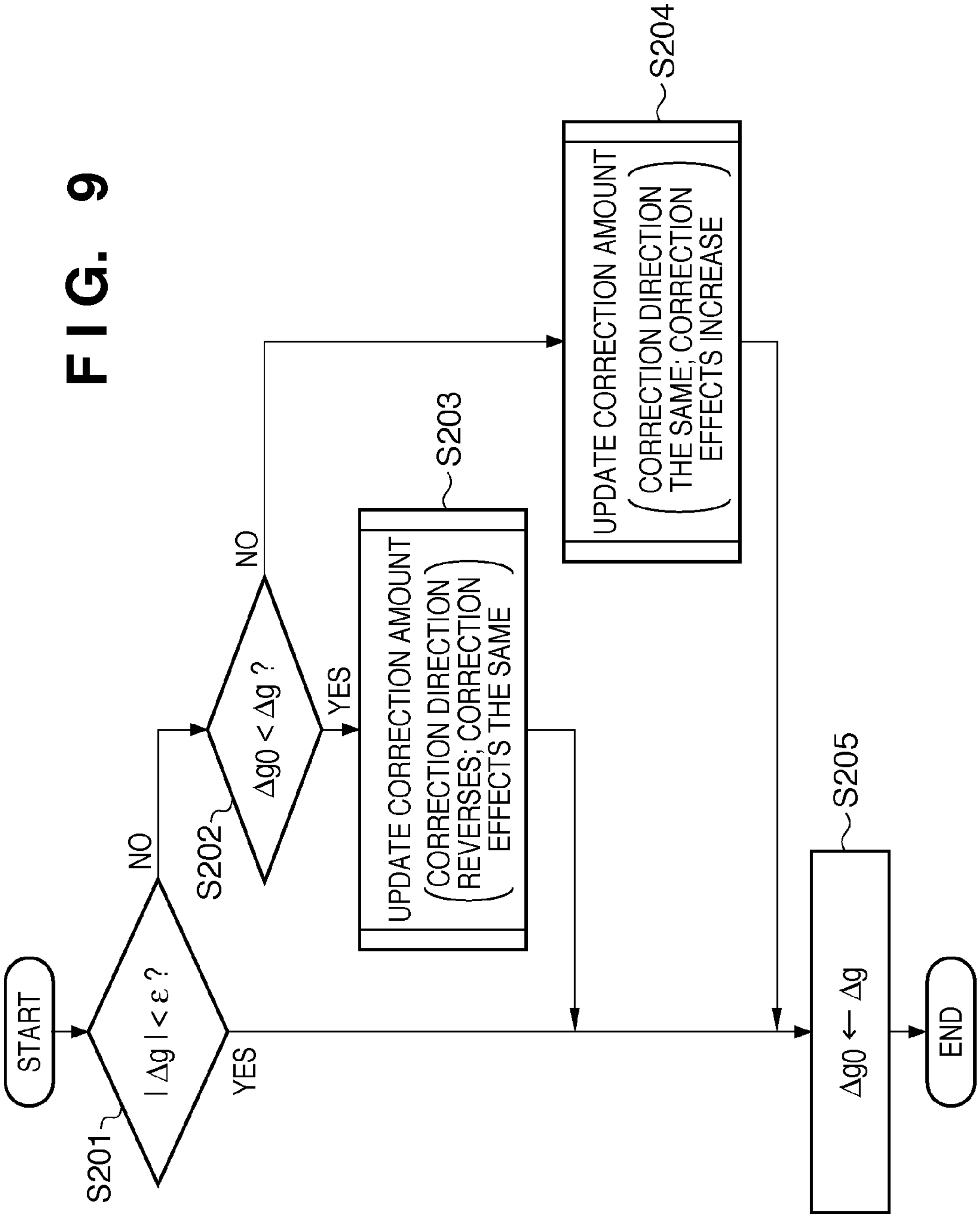
FIG. 9 is a flowchart illustrating a correction amount update process.

FIG. 9 illustrates a flowchart that describes the process for updating the correction amount 133, but the conditions for updating the correction amount 133 are not limited to this example. Hereinafter, Δg represents the difference 132 calculated by the difference value calculation unit 33 for a certain frame; |Δg| represents the absolute value of Δg; and ε represents a threshold.

First, in S201, the absolute value of Δg and the threshold ε are compared. If the absolute value of Δg is greater than or equal to the threshold ε, the correction amount 133 is updated in S202 and on, whereas if the absolute value of Δg is less than the threshold ε, the correction amount 133 is not updated. The sensitivity of the correction process is adjusted through the process of S201. In other words, the frequency at which the correction amount 133 is updated will drop if a larger value is used for the threshold ε, resulting in a drop in the sensitivity of the correction process. Conversely, the correction amount 133 will be updated frequently if a smaller value is used for the threshold ε, resulting in an increase in the sensitivity of the correction process. Note that a pre-set fixed value may be used for the threshold ε, or the value may be changed dynamically.

In S202, Δg is compared to the previous difference Δg0. Here, the previous difference Δg0 is the value calculated by the difference value calculation unit 33 immediately before, and in this example, the value of the difference Δg calculated for the previous frame is held as this value. If the previous difference Δg0 is less than the difference Δg, or in other words, if the difference Δg has increased, the process branches to S203. Conversely, if the previous difference Δg0 is greater than or equal to the difference Δg, or in other words, if the difference Δg has not changed or has decreased, the process branches to S204.

In S203, a process for the case where the difference Δg is increasing is carried out. An increase in the difference Δg indicates that the measured center location based on the measurement value 111 is deviating from the expected center location 131 and there is the possibility that the direction of the correction process is inappropriate, and thus the correction amount 133 is updated. The updated correction amount 133 reverses the direction of the correction process from the current correction amount 133. However, the updated correction amount 133 and the current correction amount 133 are assumed to have the same effects in terms of the correction process, or in other words, that the effects resulting from the correction processes are the same. For example, in the case where a filter is employed as the correction unit 41, the same filter coefficient matrix norm can be used.

Meanwhile, in S204, a process for the case where the difference Δg has not changed or is decreasing is carried out.

In this case, the measured center location based on the measurement value 111 is approaching the expected center location 131, and thus the direction of the correction process is considered to be appropriate. However, because the difference Δg is greater than the threshold ϵ, in S204, the correction amount 133 is updated so that the correction effects increase with the direction of the correction process remaining as-is.

Finally, in S205, the current difference Δg is substituted for Δg0 and saved.

As described thus far, the correction amount calculation unit 34 updates the correction amount 133 dynamically for each frame in the image signal 201 while saving the difference Δg in the frame that is currently being processed as Δg0.

As described thus far, according to the second embodiment, the correction amount 133 is updated dynamically so that the distribution of light amount measured from the display screen 100 when the corrected image signal 202 is actually displayed approaches the distribution of light amount that is expected based on the uncorrected image signal 201. Accordingly, with the second embodiment, in the case where a display problem region is present in the display screen 100, the effects of correcting that region can be verified dynamically, thus making it possible to consistently carry out the optimal correction process.

Although the second embodiment describes an example in which the correction amount 133 is updated for each frame in the image signal 201, it should be noted that this process can also be applied to still images. In other words, after correcting a still image based on the correction amount 133, the corrected still image may be displayed in the display screen 100, and the same process may then be repeated until the obtained difference Δg drops below ϵ.

(Third Embodiment)

Hereinafter, a third embodiment of the present invention will be described. Although the aforementioned second embodiment illustrates an example in which the light power density distribution sensor 11 is configured of a PSD, the third embodiment illustrates an example in which the light power density distribution sensor 11 is configured of a device in which light-receiving portions exist in a discrete state, as is the case with a CCD or a CMOS sensor. Hereinafter, the light power density distribution sensor 11 according to the third embodiment will be denoted as a CCD 11; the other elements are the same as those described in the second embodiment, and thus the same numerals will be assigned thereto. Hereinafter, the third embodiment will be described in detail focusing primarily on areas that differ from the second embodiment.

In the third embodiment, the output of the CCD 11 can be obtained from each of the light-receiving portions, and the output of the CCD 11 is in a one-dimensional vector format. Assuming that the output of the CCD 11 on one side of the display screen 100, or in other words, the output of S(i), is {Iai(t)}, the output 111 of the light power density distribution measurement unit 1 (taken as Ia) is a collection of the outputs of the CCD 11, and can therefore be expressed through the following formula.

$$Ia=\{\{Ia1(t)\}, \{Ia2(t)\}, \{Ia3(t)\}, \{Ia4(t)\}\}$$

Expected Value Calculation Process

Figure 10:
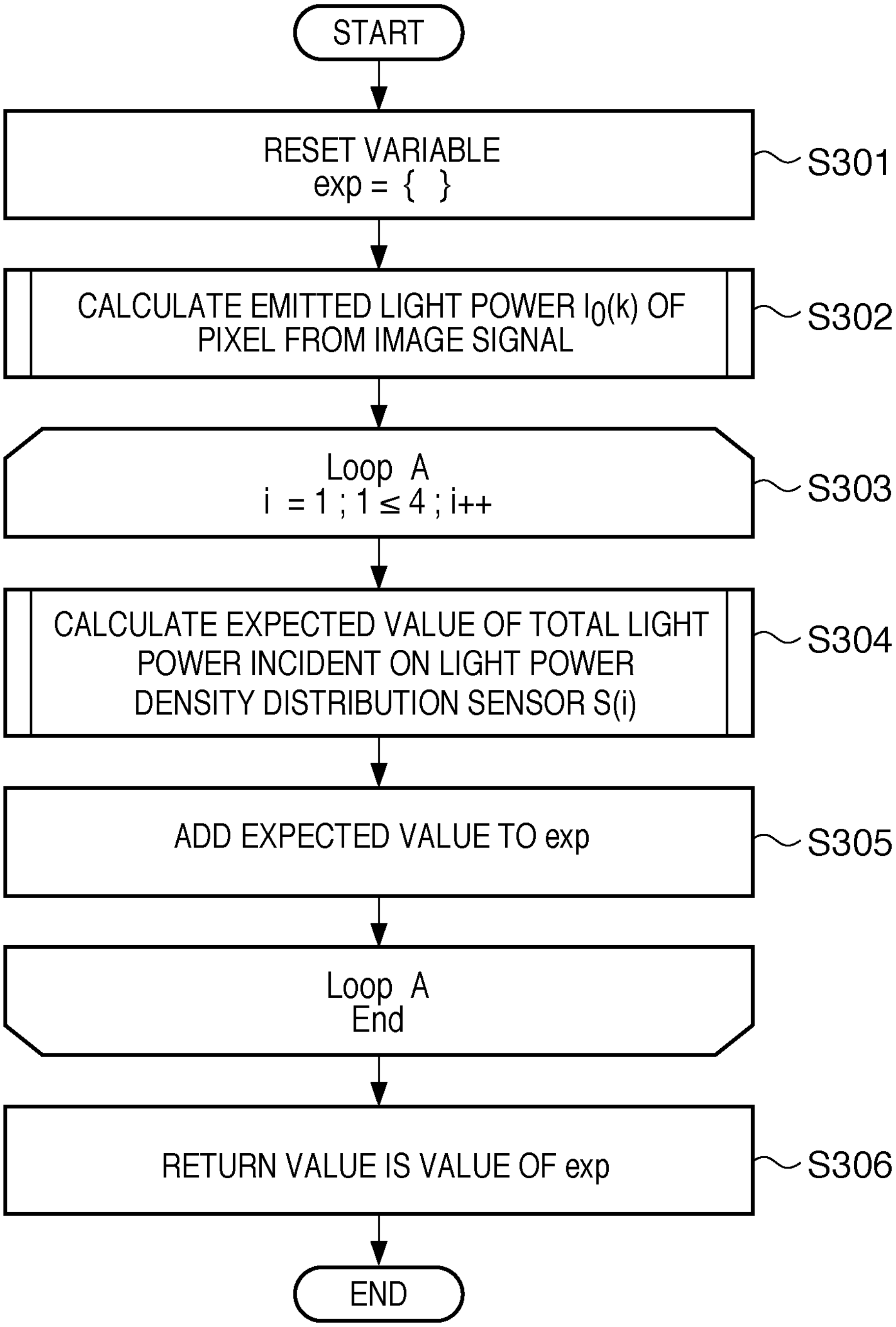
FIG. 10 is a flowchart illustrating an expected value calculation process according to a third embodiment.

In the third embodiment, the expected value calculation unit 32 calculates the distribution of light amount based on the image signal 201 as an expected distribution of light amount 131. FIG. 10 illustrates a process of an expected value calculation function executed by the expected value calculation unit 32 according to the third embodiment. Although the variables, symbols, and coordinate system of the front surface panel 12 that are used here are the same as those described in the aforementioned second embodiment, it should be noted that the variable exp is assumed to be a two-dimensional list-type variable.

In FIGS. 10, S301 and S302 are the same processes as those of S101 and S102 illustrated in FIG. 8 and described in the second embodiment. In other words, first, in S301, the variable exp is reset, and then, in S302, the light emission power of each of the pixels {Io(k): 1≦k≦n} is calculated from the image signal 201.

Next, in step S303, the processes from S304 to S305 are repeated for each of the CCDs 11 (S(1) to S(4)). First, in S304, the expected value I(t) of the total light power incident on the CCD 11 is calculated, as in S104 in FIG. 8. However, because the variable t can only take on a coordinate value in which a light-receiving portion in the CCD 11 is present, the variable t is a discrete number in the third embodiment, as opposed to a continuous number as in the second embodiment.

Next, in S305, a collection {I(t)} of the expected values I(t) calculated in S304 is added to the variable exp. Because the variable exp is a two-dimensional list type variable in the third embodiment, the addition process of S305 can be executed using a normal list process. Finally, in S306, the value of the variable exp is set for the return value, and the process returns to invoking.

As described thus far, with the expected value calculation unit 32 of the third embodiment, a discrete distribution of light amount expected to be detected by the CCD 11 is stored as-is as the return value of the expected value calculation function for the distribution of light amount.

Difference Value Calculation Process

Hereinafter, a process by which the difference value calculation unit 33 according to the third embodiment calculates a difference between the measured value and the expected value of the distribution of light amount will be described.

First, the difference value calculation unit 33 obtains, for the display screen 100 displayed based on the image signal 201 or 202, the distribution of light amount for the entirety of the display screen 100 as a measured distribution of light amount, based on the measurement value 111 from the light power density distribution measurement unit 1. Next, the difference value calculation unit 33 calculates the difference 132 between the measured distribution of light amount based on the output 111 and the expected distribution of light amount 131 calculated by the expected value calculation unit 32. In other words, because, as described earlier, the output 111 of the light power density distribution measurement unit 1 is as follows:

$$Ia=\{\{Ia1(t)\}, \{Ia2(t)\}, \{Ia3(t)\}, \{Ia4(t)\}\}$$

the expected distribution of light amount 131 calculated by the expected value calculation unit 32 is likewise expressed as follows:

$$Ie=\{\{Ie1(t)\}, \{Ie2(t)\}, \{Ie3(t)\}, \{Ie4(t)\}\}$$

Accordingly, that difference ΔI (132) is calculated through the following Formula (9).

$$\Delta I = I_a - I_e = \begin{pmatrix} I_{a1}(t) \\ I_{a2}(t) \\ I_{a3}(t) \\ I_{a4}(t) \end{pmatrix} - \begin{pmatrix} I_{e1}(t) \\ I_{e2}(t) \\ I_{e3}(t) \\ I_{e4}(t) \end{pmatrix} \quad (9)$$

Correction Amount Calculation Process

The correction amount calculation process performed by the correction amount calculation unit 34 is the same as that performed in the second embodiment; the results of the correction carried out on the entire image are verified, and the correction is repeated so that the measured distribution of light amount approaches the expected distribution of light amount to a sufficient degree, or in other words, so that the difference ΔI becomes sufficiently small. To be more specific, if the absolute value of the difference ΔI is greater than or equal to the threshold ε, the correction amount 133 is updated, whereas if the absolute value of the difference ΔI is less than the threshold ε, the correction amount 133 is not updated. In the case where the correction amount 133 is updated, the direction of the correction process is reversed if the difference ΔI is increasing. On the other hand, if the difference ΔI is decreasing, the correction amount 133 is updated so as to increase the effects of the correction while maintaining the same direction for the correction process. It should be noted, however, that the correction amount calculation process according to the third embodiment is not intended to be limited to this example.

As described thus far, according to the third embodiment, appropriate correction based on the image signal 201 that is actually to be displayed can be carried out in the same manner as in the aforementioned second embodiment, even in the case where the light amount density distribution sensor includes a discrete light-receiving portion.

According to the present invention configured as described above, display problem areas can easily and accurately be detected in a display screen of an image display apparatus. In addition, a display that suppresses the effects of those display problem areas can be carried out.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282219 filed on Dec. 11, 2009, which is hereby incorporated by reference herein in its entirety.

What is claimed is:

1. An image display apparatus having a display screen configured of a plurality of pixels, the apparatus comprising:

a measurement unit adapted to measure a distribution of light amount when the display screen carries out a display;

a detection unit adapted to detect a display problem region in the display screen based on an imbalance in the display screen of the distribution of light amount measured by the measurement unit when a uniform image is displayed in the display screen; and a correction unit adapted to perform correction on an image signal that is to be displayed in the display screen so as to suppress the influence of the display problem region on the display, wherein the correction unit includes:

an expected value calculation unit adapted to calculate an expected value of a distribution of light amount that is expected to be obtained when an image based on the image signal is displayed in the display screen;

a difference value calculation unit adapted to calculate a difference value between the expected value and a measured value of a distribution of light amount measured by the measurement unit when an image based on the image signal corrected by the correction unit is displayed in the display screen; and a correction amount calculation unit adapted to calculate a correction amount for the display problem region detected by the detection unit based on the difference value, wherein the correction unit corrects the image signal based on the correction amount, and wherein the measurement unit is disposed in a boundary area of a front surface panel of the display screen.

2. The image display apparatus according to claim 1, wherein the measurement unit measures a first distribution of light amount in a first direction of the display screen and a second distribution of light amount in a second direction that is orthogonal to the first direction.

3. The image display apparatus according to claim 2, wherein the front surface panel of the display screen has a rectangular shape; and of the four sides of the front surface panel, the measurement unit measures the first distribution of light amount on a first side and measures the second distribution of light amount on a second side that is orthogonal to the first side.

4. The image display apparatus according to claim 3, wherein the first sides and the second sides respectively are sides that are opposite to each other in the four sides of the front surface panel.

5. The image display apparatus according to claim 1, wherein the detection unit divides the entire region of the display screen and detects the display problem region based on an imbalance in the distribution of light amount measured by the measurement unit when a uniform image is displayed in each of the regions obtained through the dividing.

6. The image display apparatus according to claim 1, wherein the correction unit:

calculates, using the difference value calculation unit, a difference value between the expected value and a measured value obtained when the image signal corrected based on the correction amount is displayed in the display screen; and repeats the calculation of the correction amount using the correction amount calculation unit until the difference value becomes smaller than a predetermined value.

7. The image display apparatus according to claim 6, wherein the image signal is a signal of a single frame in a moving picture; and the correction unit carries out correction by applying the correction amount calculated for a first frame to a second frame that continues after the first frame.

8. A control method of an image display apparatus having a display screen configured of a plurality of pixels, the method comprising:

a measuring step of measuring a distribution of light amount when the display screen displays a uniform image;

a detecting step of detecting a display problem region in the display screen based on an imbalance in the display screen of the measured distribution of light amount; and a correcting step of performing correction on an image signal that is to be displayed in the display screen so as to suppress the influence of the display problem region on the display, wherein the correcting step includes:

an expected value calculation step of calculating an expected value of a distribution of light amount that is expected to be obtained when an image based on the image signal is displayed in the display screen;

a difference value calculation step of calculating a difference value between the expected value and a measured value of a distribution of light amount measured in the measuring step when an image based on the image signal corrected in the correcting step is displayed in the display screen; and a correction amount calculation step of calculating a correction amount for the display problem region detected in the detecting step based on the difference value, wherein in the correcting step the image signal is corrected based on the correction amount, and wherein in the measuring step, the distribution of light amount is measured using a sensor disposed in a boundary area of a front surface panel of the display screen.

9. A non-transitory computer-readable storage medium storing a computer program for causing a computer in an image display apparatus to execute the steps of the control method of an image display apparatus according to claim 8.

10. The control method according to claim 8, wherein the measurement step measures a first distribution of light amount in a first direction of the display screen and a second distribution of light amount in a second direction that is orthogonal to the first direction.

11. The control method according to claim 10, wherein the front surface panel of the display screen has a rectangular shape; and of the four sides of the front surface panel, the measurement step measures the first distribution of light amount on a first side and measures the second distribution of light amount on a second side that is orthogonal to the first side.

12. The control method according to claim 11, wherein the first sides and the second sides respectively are sides that are opposite to each other in the four sides of the front surface panel.

13. The control method according to claim 8, wherein the detection step divides the entire region of the display screen and detects the display problem region based on an imbalance in the distribution of light amount measured by the measurement unit when a uniform image is displayed in each of the regions obtained through the dividing.

14. The control method according to claim 8, wherein the correction step:

calculates, using the difference value calculation unit, a difference value between the expected value and a measured value obtained when the image signal corrected based on the correction amount is displayed in the display screen; and repeats the calculation of the correction amount using the correction amount calculation unit until the difference value becomes smaller than a predetermined value.

15. The control method according to claim 14, wherein the image signal is a signal of a single frame in a moving picture; and the correction step carries out correction by applying the correction amount calculated for a first frame to a second frame that continues after the first frame.

* * * * *